(12) United States Patent
Whitby-Strevens (10) Patent No.: US 8,810,560 B2
(45) Date of Patent: Aug. 19, 2014

(54) METHODS AND APPARATUS FOR SCRAMBLER SYNCHRONIZATION

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 792 days.

(21) Appl. No.: 12/966,918

(22) Filed: Dec. 13, 2010

(65) Prior Publication Data

US 2012/0146989 A1 Jun. 14, 2012

(51) Int. Cl.
*G06F 3/038* (2013.01)
*G09G 5/00* (2006.01)
*H04W 56/00* (2009.01)

(52) U.S. Cl.
CPC .................................. *H04W 56/001* (2013.01)
USPC ............................................ 345/213; 710/65

(58) Field of Classification Search
CPC ............ H04W 56/001; H04W 56/002; H04W 56/0015; H04N 19/00909
USPC ........................................................ 345/213
See application file for complete search history.

(56) References Cited

U.S. PATENT DOCUMENTS

| | | | |
|---|---|---|---|
| 5,931,908 A * | 8/1999 | Gerba et al. .................. | 709/219 |
| 2007/0294520 A1 * | 12/2007 | Leigh et al. ....................... | 713/1 |
| 2009/0179883 A1 * | 7/2009 | Goodart et al. ............... | 345/211 |
| 2010/0272102 A1 * | 10/2010 | Kobayashi ..................... | 370/389 |
| 2011/0164673 A1 * | 7/2011 | Shaffer ..................... | 375/240.01 |
| 2011/0249780 A1 * | 10/2011 | Mollfulleda San Julian et al. ............................. | 375/354 |

OTHER PUBLICATIONS

VESA DisplayPort Standard, Version 1, Revision 1a, Jan. 11, 2008.*

* cited by examiner

*Primary Examiner* — Farley Abad
(74) *Attorney, Agent, or Firm* — Womble Carlyle Sandridge & Rice LLP

(57) ABSTRACT

Methods and apparatus for enhanced synchronization of a descrambler, such as used in a signal interface that carries scrambled data. In one embodiment, the descrambler self-synchronizes to a scrambled bit stream (rather than receiving an external "sync" trigger), thereby allowing for much more rapid synchronization. This is accomplished in one variant by identifying a scrambled symbol that has an expected value, predicting an internal scrambler seed based on the expected value, and verifying the predicted seed. For example, an invention-enabled device can synchronize to a DisplayPort stream during blanking intervals which are filled with known "dummy" bytes. Blanking intervals are much more frequent than explicit synchronization symbols, thus an invention enabled device can greatly improve synchronization times, and eliminate e.g., visual artifacts.

17 Claims, 8 Drawing Sheets

METHODS AND APPARATUS FOR SCRAMBLER SYNCHRONIZATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices and data networking. More particularly, in one exemplary aspect, the present invention is directed to computerized interfaces, such as for example for self-synchronization of audio/visual (AV) entities.

2. Description of Related Technology

Presentation of audio and visual elements has a direct impact on customer satisfaction. For example, many multimedia devices are widely judged (and purchased) according to qualities such as: display quality, sound fidelity, smooth rendering, crispness of the display, etc. Other areas of multimedia applications which affect consumers include interoperation (e.g., with other equipment, legacy standards, etc.), ease of use, cost, etc, To these ends, Audio/Visual (A/V) interface technologies have evolved from simple display logic circuits to complex systems capable of, inter alia, platform-independent operation, networked operation, etc. Moreover, current display interface technologies support seamless legacy display operation; newer functionality is layered over existing protocols. For example, secondary data may be transmitted during time intervals which are otherwise ignored by legacy devices.

DisplayPort™ is one example of a display interface technology referred to above. It is specified by the Video Electronics Standards Association (VESA). Current incarnations of the DisplayPort standard specify support for simple networking of digital audio/visual (A/V) interconnects, intended to be used primarily between an arbitrary assembly of multimedia "sources" (e.g., computers or CPUs) and "sinks" (e.g., display monitors, home-theater system, etc.).

Extant DisplayPort technology is an extensible digital interface solution that is designed for a wide variety of performance requirements, and broadly supports inter alia, PCs, monitors, panels, projectors, and high definition (HD) content applications. Current DisplayPort technology is also capable of supporting both internal (e.g., chip-to-chip), and external (e.g., box-to-box) digital display connections. Examples of internal chip-to-chip applications include notebook PCs, which drive a display panel from a graphics controller, or display components from display controllers driving the monitor of a television. Examples of box-to-box applications include display connections between PCs and monitors, and projectors (e.g., not housed within the same physical device). Consolidation of internal and external signaling methods enables the "direct drive" of digital monitors. Direct drive eliminates the need for control circuits, and allows for among other things, less costly and reduced profile (e.g., slimmer) display devices.

The current revision of DisplayPort (DisplayPort 1.2) transmits both control symbols and data symbols. Data symbols are scrambled in order to impart certain desirable characteristics, inter alia, provide DC-balance on the transmission medium, etc. Control symbols are not scrambled in this revision. Non-scrambled control symbols advantageously allow the comparatively rare control symbols to be instantly identified when received at, for example, a sink.

Additionally, current DisplayPort standards support flexible management of processors for generating display data. For example, DisplayPort systems support using a multiplexer (mux) to select between several GPUs (Graphics Processing Units); the currently selected GPU drives one (1) eDP (embedded Display Panel). Each time the mux switches from one GPU to another, the newly selected GPU must be synchronized with the eDP.

The scrambler state is specific to each GPU and is constantly changing; thus, during a switch the eDP must re-synchronize to the new GPU's scrambler. Without some information as to the scrambler's current state, the descrambler must wait for a known scrambler state to align its timing. Current implementations of DisplayPort periodically transmit a Scrambler Reset (SR) unscrambled control code for this purpose. Unfortunately, these SR signals occur very infrequently.

Experimental results have shown that prior art synchronization processes typically last approximately fourteen (14) milliseconds; however, worst-case operation can exceed twenty seven (27) milliseconds. Large switching delays can cause visual artifacts such as "bleaching", "flashing", etc. Humans can generally perceive visually unacceptable artifacts when transition times exceed sixteen (16) milliseconds. Thus, prior art solutions operate in a marginal range; a large percentage of transitions may detrimentally affect the perceived display quality.

Accordingly, improved apparatus and methods are needed to improve synchronization between devices being interfaced (e.g., two DisplayPort-enabled devices). Such improved apparatus and methods should ideally reduce synchronization times to acceptable levels for human perception of audio and visual content, even during worst-case operational conditions. More generally, such apparatus and methods would be useful to reduce synchronization times between peer entities for a wide array of audio/visual (A/V) applications.

Useful solutions should also seamlessly operate with existing protocols, messaging formats, etc. Such solutions would not add substantial additional messaging overhead, significantly decrease existing data rates, change message formats, etc., nor significantly impact existing system capabilities. Furthermore, useful solutions would permit backwards compatible operation with previously deployed legacy equipment, software, etc.

SUMMARY OF THE INVENTION

The present invention satisfies the aforementioned needs by providing improved apparatus and methods for self-synchronization of audio/visual (AV) entities.

In one aspect of the invention, a method of synchronizing a source and sink for transmission of a data stream over an interface is disclosed. In one embodiment, the method avoids the occurrence of significant user-detectable artifacts by: receiving at least a portion of the data stream at the sink; detecting a triggering event; based at least in part on the triggering event, utilizing one or more encoded values within the at least received portion to perform self-synchronization of the sink, the one or more encoded values occurring at a frequency greater than that of one or more synchronization symbols transmitted within the data stream from the source.

In one variant, the interface comprises an interface compliant with the DisplayPort specification, and the encoded values comprise dummy bytes transmitted within a blanking line of a video frame. In one such variant, the synchronization symbols comprise DisplayPort Scrambler Reset (SR) symbols.

In another variant, the user-detectable artifact includes visual image bleaching.

In yet another variant, the act of detecting a triggering event includes detecting a triggering event within the at least portion of data stream. For example, in one variant, detecting a triggering event within the at least portion of data stream comprises detecting one or more unencoded symbols.

In yet another variant the act of detecting a triggering event comprises detecting a triggering event associated with connection of the interface.

In a second aspect of the invention, a method for providing scrambler self-synchronization is disclosed. In one embodiment, the method includes: identifying a scrambled symbol that has an expected value; predicting an internal scrambler current state value based at least in part on the expected value; and verifying the predicted current state value; wherein successful completion of the verification of the predicted current state value indicates that the scrambler is synchronized.

In one variant, the current state value comprises a seed, and the scrambler includes an additive LFSR.

In another variant, the successful completion of the verification of the predicted current state value comprises successful decoding of one or more arriving encoded symbols using the current state value.

In still a third variant, the successful completion of the verification of the predicted current state value comprises a successful Cyclic Redundancy Check (CRC) or parity check on one or more decoded symbols.

In a fourth variation, the current state value is predicted based at least in part on (i) one or more received symbols; and (ii) one or more expected values.

In yet another variant, the scrambler is part of a DisplayPort compliant device, and the scrambled symbol is part of a data stream received at the device from another DisplayPort compliant device via a DisplayPort compliant interface between the two devices.

In yet another aspect of the invention, a digital computerized apparatus is disclosed. In one embodiment, the digital computerized apparatus includes: a processor in data communication with a network interface; a descrambler apparatus comprising a linear feedback shift register; and a computer readable apparatus having a storage medium with at least one computer program stored thereon. The computer program is configured to: when an unscrambled control symbol is received via the network interface, derive a first sequence of bits; at least partially seed the linear feedback shift register with the first sequence of bits; and determine the self-synchronization state of the descrambler based on one or more predetermined criteria.

In one variant, the network interface comprises an interface compliant with the DisplayPort specification, and the unscrambled control symbol is selected from the group consisting of: (i) a Blanking Start (BS), and (ii) a Secondary-data End (SE).

In another variant, the derivation of the first sequence of bits includes derivation of a seed value based at least in part on an encoded symbol bearing a known relationship to the unscrambled control symbol.

In a third variant, the one or more predetermined criteria include at least determination of whether an encoded symbol has been successfully decoded.

In a third aspect of the invention, computer readable apparatus having a storage medium with at least one computer program stored thereon is disclosed. In one embodiment, the at least one computer program includes a plurality of computer executable instructions that when executed by the processor: derive one or more seeds based on at least (i) one or more first coded symbols, and (ii) one or more corresponding first expected symbols; decode one or more second coded symbols, wherein the one or more second coded symbols have one or more corresponding second expected symbols; and verify that the decoded one or more second symbols match the one or more corresponding second expected symbols.

In a fourth aspect of the invention, a method of synchronizing a source and sink for transmission of a data stream over a signal interface us disclosed. In one embodiment, the method avoids the occurrence of significant user-detectable video artifact, by: receiving at least a portion of the data stream at the sink; and utilizing one or more symbols within the at least received portion to perform self-synchronization of the receiver, the one or more symbols occurring at an interval within the data stream that is less than a maximum allowable synchronization interval associated with the significant user-detectable video artifact.

Other features and advantages of the present invention will immediately be recognized by persons of ordinary skill in the art with reference to the attached drawings and detailed description of exemplary embodiments as given below.

DETAILED DESCRIPTION OF THE INVENTION

Reference is now made to the drawings, wherein like numerals refer to like parts throughout.

Overview

In one aspect, the present invention provides methods and apparatus for self-synchronization of a scrambler. In one embodiment (specific to DisplayPort), a Linear Feedback Shift Register (LFSR)-based scrambler is used, which self-synchronizes to "dummy" bytes transmitted within the blanking lines of a video frame. The much higher frequency of dummy bytes within blanking lines (compared to Scrambler Reset (SR) symbols), greatly accelerates the scrambler synchronization step, thereby reducing overall synchronization times. The improved synchronization time easily supports acceptable levels for display switching, even during worst-case operation. Such apparatus and methods can be broadly applied to reduce synchronization times for a wide array of audio/visual (A/V) applications outside of DisplayPort as well.

Specifically, one embodiment of the self-synchronizing scrambler identifies the hidden seed or state of a peer entity, based on the scrambled data stream from the peer entity. For DisplayPort implementations, various aspects of the present invention disclose mathematically deriving the scrambling LFSR state, based on one or more received bytes that are generated from dummy bytes that have a known value. The derived LFSR bits are verified against subsequently received symbols (also dummy bytes).

Methods and apparatus for self-synchronization are described in greater detail subsequently herein. Various aspects of the present invention can be widely applied to: (i) identification of encoded symbols having expected values, (ii) predicting code seeds based on known expected values, and/or (iii) verification of predicted code seeds. Corresponding apparatus and business methods for use in conjunction with various aspects of the present invention are also described.

The various aspects of the present solution operate freely with existing protocols, messaging formats, etc. For example, exemplary embodiments of the present invention can self-synchronize to practical implementations of DisplayPort dummy bytes. Advantageously, no additional control symbols or protocols are required for legacy DisplayPort devices.

Detailed Description of Exemplary Embodiments

Exemplary embodiments of the present invention are now described in detail. While these embodiments are primarily discussed in the context of a Video Electronics Standards Association (VESA) DisplayPort audio/visual (A/V) component network, it will be recognized by those of ordinary skill that the present invention is not so limited.

In fact, the various aspects of the invention are useful in any network that can benefit from rapid synchronization of A/V entities, based on known or otherwise predictable symbols occurring within streaming data.

Additionally, the present invention is useful in any number of different types of devices including without limitation computers, hand-held devices such as smartphones and MP3 players, digital readers or tablets, navigation systems (hand-held and in-vehicle), etc. For example, a hand-held device can use DisplayPort technologies for both the internal panel and external displays.

Moreover, while the following embodiments are primarily discussed in the context of a stream of data comprising: (i) unscrambled control symbols, and (ii) scrambled data symbols, it will be recognized by those of ordinary skill that the present invention is useful with literally any type of scrambling algorithm or encoding scheme.

Exemplary DisplayPort Video Stream—

As used herein, the term "DisplayPort" refers without limitation to apparatus and technology compliant with "VESA DisplayPort Standard"—Version 1, Revision 2 dated Jan. 5, 2010; "VESA DisplayPort Panel Connector Standard"—Version 1.1 dated Jan. 4, 2008; "VESA DisplayPort PHY Compliance Test Standard"—Version 1.1 a dated Oct. 26, 2009; and/or "VESA DisplayPort Link Layer Compliance Test Standard"—Version 1.1a dated Oct. 2, 2009, as well as so-called "Mini DisplayPort" technology described in the VESA DisplayPort Version 1, Revision 2 dated Jan. 5, 2010, each of the foregoing being incorporated herein by reference in its entirety, and any subsequent revisions thereof.

Figure 1:
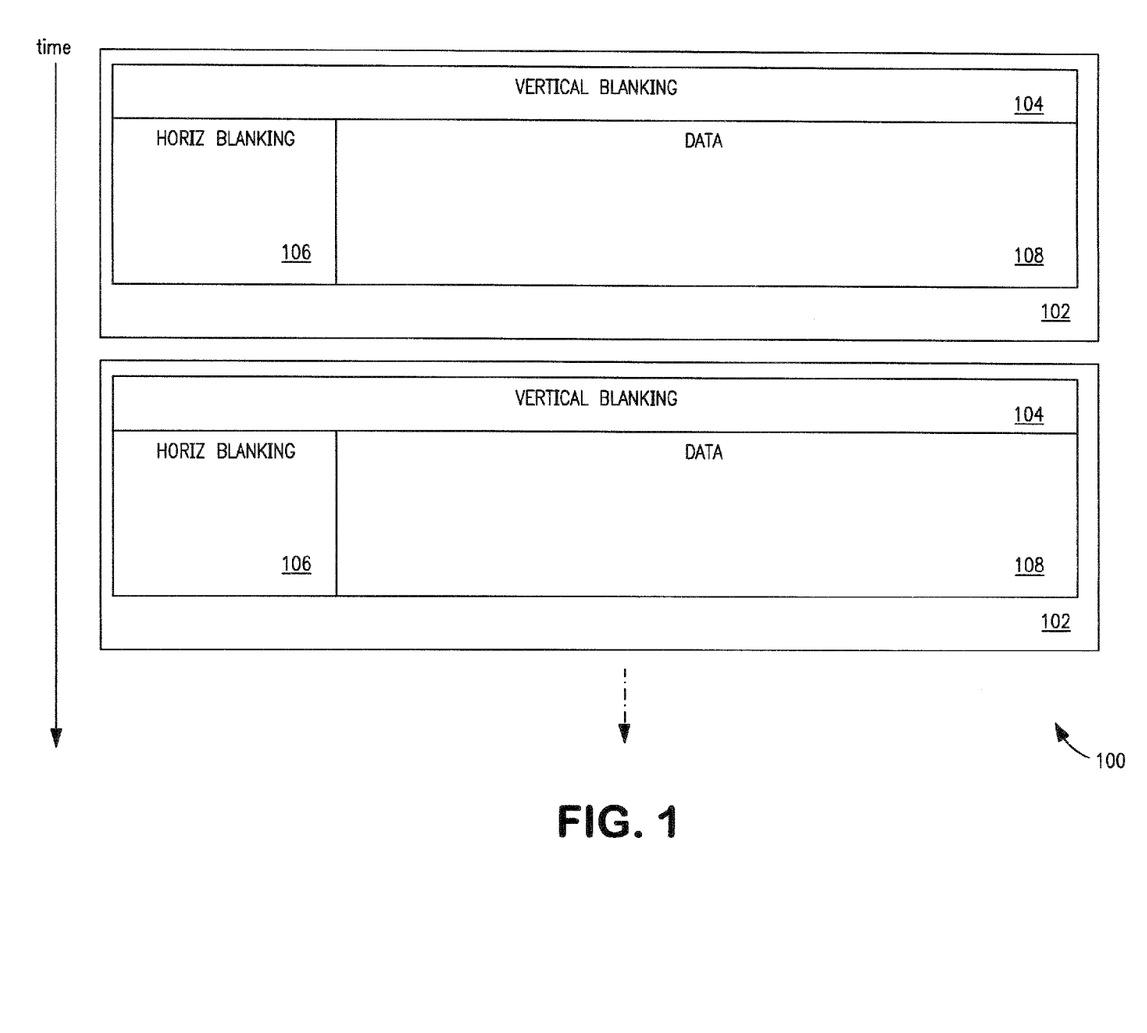
FIG. 1 is a graphical representation of one exemplary video stream useful in accordance with one embodiment of the present invention.

FIG. 1 is a graphical representation of one exemplary video stream 100. As shown, the video stream is formatted as a sequence of video frames 102 (typically at the rate of 60 Hz, approximately 16.67 ms per frame). For historical reasons, the video frame 102 is divided into "scan" lines. A 1280×800 resolution frame would have 800 scan lines. As shown, scan lines are divided into two line types: (i) vertical blanking lines 104 and (ii) video data lines. Typically, the first twenty two (22) scan lines of a video frame are vertical blanking lines, and the remaining portion is video data. Video data lines are further subdivided into horizontal blanking intervals 106 followed by video data 108. As appreciated by those having ordinary skill in the related arts, blanking information (in both the vertical blanking lines, and horizontal blanking intervals) enables compatible operation with legacy display standards (e.g., Cathode Ray Tubes (CRTs), etc.). Blanking information does not contain video data, but can be used for providing other information (e.g., audio data, metadata, supplemental data, etc.)

Figure 2:
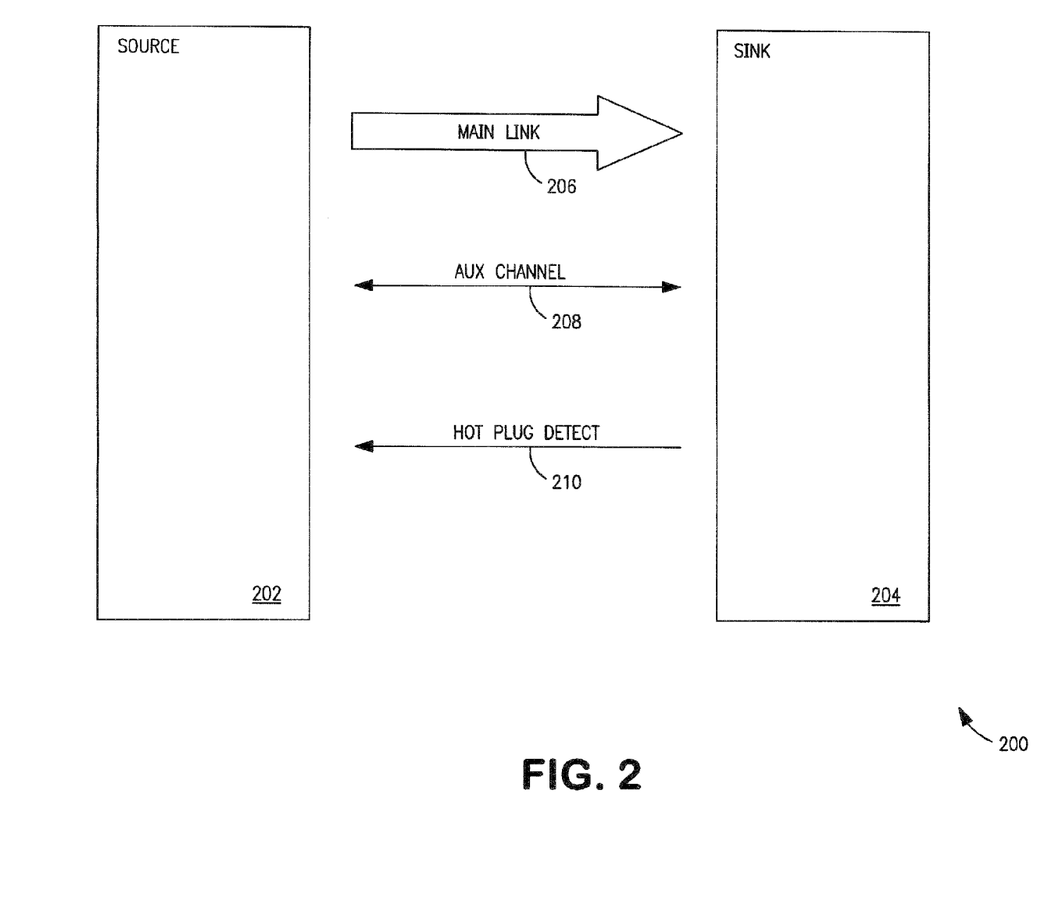
FIG. 2 is a graphical illustration of one exemplary DisplayPort link 200 between a source and a sink.

FIG. 2 graphically illustrates one exemplary DisplayPort link 200 between a source 202 and a sink 204; the DisplayPort link includes: (i) a main link 206, (ii) an auxiliary channel 208, and (iii) a Hot Plug Detect (HPD) 210. The main link is a unidirectional, high-bandwidth, low-latency channel used for transport of isochronous data streams (such as the exemplary video stream 100 of FIG. 1). The auxiliary channel is a half-duplex bidirectional channel used for link management and control. The HPD provides connection detection, and may also be tied to hardware or software interrupt processes.

The exemplary DisplayPort main link 202 can support one (1), two (2), or four (4) "lanes". Each lane is an AC-coupled, doubly-terminated differential pair. DisplayPort source 202 and sink 204 devices are allowed to dynamically reduce lane usage (e.g., to reduce traffic). For example, a device that supports four lanes may throttle usage down to two or one lane(s).

The main link 202 video data may be configured to handle versatile payload types, including varying pixel bits depths, varying component bit depths, different colorimetry formats (e,g., RGB, YCbCr, etc.), and so forth. The payload configuration is performed independent of the number of main link lanes. Moreover, DisplayPort implementations do not provide a separate clock; instead, a link clock is recovered from the data stream itself.

Each source 202 generates a data stream which is first scrambled and then encoded with an 8B/10B line code. Each sink 204 receives a data stream which is first decoded, and then descrambled. Detailed discussions of line coding and scrambling are presented hereinafter.

8B/10B Line Coding—

Line codes, such as the 8B/10B line code, are codes which format a digital signal that is to be transmitted over a communication medium into a form that is optimized for transmission over a given physical channel. Consequently, a line code will typically be chosen to complement the physical capabilities of a given transmission medium, such as optical fiber or shielded twisted pair copper wire. These characteristics are unique for each transmission medium, because each medium has different characteristics associated with it such as signal distortion characteristics, capacitance, etc.

Many of these line codes are optimized for long-distance or high-speed communication channels that are hindered when transmitting a signal with a DC component. This DC component present within a signal is also known as a disparity, bias, or the DC coefficient. Line codes which aim to eliminate the DC component of a transmitted signal are known as DC-balanced line codes.

Constant-weight line codes (such as e.g., a Manchester H code utilized in the auxiliary channel of a DisplayPort network) are a first type of DC balanced line code that is designed so that each transmitted code word is balanced in a way that for each positive value within a code word, a substantially equal number of negative values exists. Accordingly, constant-weight line codes transform a signal to be transmitted such that the average power level over each code word is balanced.

Paired disparity line codes, on the other hand, are designed such that for every code word that averages to a negative level, another code word exists in the data stream that averages out to a positive level, thereby balancing out the transmitted signal. Paired disparity line codes typically work by keeping track of the running DC buildup at the transmitter. By keeping track of the running DC buildup, code words that tend to balance the DC level back towards zero can be selected at the transmitter. Examples of paired disparity line codes include the aforementioned 8B/10B line code.

DisplayPort utilizes the ANSI 8B/10B encoding (specified in ANSI X3.230-1994, clause 11, incorporated herein by reference in its entirety). 8B/10B encoding maps an 8-bit data byte or one of a set of twelve control symbols to a 10-bit symbol in order to achieve the aforementioned DC balance. The mapping is such that the mapped versions of the control symbols and data symbols are distinct. The 8-bit symbol can either be an 8-bit data byte or a control symbol. In both cases, they are mapped into 10-bit symbols. One particularly useful property of 8B/10B encoded symbols is that in any sequence of 10-bit symbols, there will never be more than a disparity of +1 or −1 when counting the number of ones and zeros (at symbol boundaries). For example, if after a number of 10-bit symbols the running disparity is −1, then the next symbol will either have exactly five (5) ones and five (5) zeros (i.e., the running disparity remains −1), or it will have six (6) ones and four (4) zeros (i.e., the running disparity changes to +1). Since the running disparity is only used at symbol boundaries, the bit-wise running disparity can range between +3 and −3.

As the scheme name suggests, eight (8) bits of data are encoded and transmitted as a 10-bit symbol. The low five (5) bits of data are encoded into a 6-bit group (i.e., the so-called 5b/6b portion) and the top three (3) bits are encoded into a 4-bit group (i.e., the so-called 3b/4b portion). These two sub-encoding groups are subsequently concatenated together to form the 10-bit symbol that is transmitted over the transmission medium. The data symbols are often referred to in the format "D.x.y" where x ranges in value from 0-31 ($2^5$=32) and y ranges in value from 0-7 ($2^3$=8); i.e., the five (5) and three (3) bit portions.

One useful property of such an encoding scheme is that since 10-bit symbols are utilized to encode 8-bit words, some of the possible one-thousand twenty-four ($2^{10}$=1024) codes can be excluded in order to comply with the previously mentioned run-length limit of five (5) consecutive equal bits, and a differential limit such that the difference of the count of zeros and ones is no more than two (2) for a given twenty bit string of bits. In addition, some of the two-hundred fifty-six (256) possible 8-bit words can be encoded in two alternative ways. Using these alternative encodings, the scheme is able to affect long-term DC-balance on the transmission line.

This DC-balance is accomplished in part via a mechanism known as "running disparity" that keeps the number of ones and zeros that are transmitted roughly equal. That is, for each 5b/6b and 3b/4b code with an unequal number of ones and zeros, there are two (2) bit patterns that can be used to transmit it. For example, a first 10-bit with two more ones then zeros can be represented as follows: 001011 1110. This first 10-bit pattern can also be represented by its inverse, thereby encoding two more two more zeros than ones as follows: 110100 0001. Accordingly, depending on the current running disparity of the signal, the encoding hardware selects which of the two possible 10-bit sequences to send for the given data.

In addition, 8B/10B encoding possesses what are known as a "special symbols". They are typically referred to in the form "K.x.y" and have different encodings from any of the possible "D.x.y" symbols; i.e., they are symbols which cannot result via the encoding of an 8-bit data symbol. Table 1 below illustrates the format for these special symbols, which include a first 10-bit code for a running disparity of negative one (−1), along with its inverse for a running disparity of positive one (+1):

TABLE 1

8B/10B Special Symbols

| Input - Special Symbols | | RD = −1 | RD = +1 |
|---|---|---|---|
| K-Codes | HGF EDCBA | abcdei fghj | abcdei fghj |
| K28.0 | 000 11100 | 001111 0100 | 110000 1011 |
| K28.1 | 001 11100 | 001111 1001 | 110000 0110 |
| K28.2 | 010 11100 | 001111 0101 | 110000 1010 |
| K28.3 | 011 11100 | 001111 0011 | 110000 1100 |
| K28.4 | 100 11100 | 001111 0010 | 110000 1101 |
| K28.5 | 101 11100 | 001111 1010 | 110000 0101 |
| K28.6 | 110 11100 | 001111 0110 | 110000 1001 |
| K28.7 | 111 11100 | 001111 1000 | 110000 0111 |
| K23.7 | 111 10111 | 111010 1000 | 000101 0111 |
| K27.7 | 111 11011 | 110110 1000 | 001001 0111 |
| K29.7 | 111 11101 | 101110 1000 | 010001 0111 |
| K30.7 | 111 11110 | 011110 1000 | 100001 0111 |

These special symbols are inserted into the data stream and accordingly, can be used for executing low-level control functions separate and apart from encoded data symbols. For example, the DisplayPort specification sets forth a number of control functions that can be mapped onto these so-called "K-codes" of the ANSI 8B/10B encoder specification. These control functions include: (K28.5) Blanking Start (BS); (K27.7) Blanking End (BE); (K30.7) Fill Start (FS); (K23.7) Fill End (FE); (K28.2) Secondary-data Start (SS); (K29.7) Secondary-data End (SE); (K28.0) Scrambler Reset (SR); (K28.1) Content Protection BS (CPBS); and (28.3) Content Protection SR (CPSR).

Scrambling—

In addition to 8B/10B line coding, the DisplayPort video stream is "scrambled" with a sixteen (16) bit scrambler. A scrambler selectively transposes or inverts a data stream before transmission. The manipulations are reversed by a descrambler at the receiving side.

A properly scrambled signal has several important properties. Scrambling ensures that the data stream does not have long uninterrupted strings of zeros or ones. Long strings of zeros or ones can: (i) confuse clock recovery circuitry, (ii) lead to erratic behavior in feedback loops, and/or (iii) cause undesirable hysteresis effects. Also, scrambled signals have much more desirable spectral power distribution (low power, wide spectral distribution). Transitions after long uninterrupted strings of zeros and ones in unscrambled signals can increase undesirable mutual inductance interference with nearby circuitry.

While 8B10B encoding alleviates the issues that would otherwise arise due to long strings of ones and zeros, DisplayPort combines 8B/10B encoding with scrambling for desirable spectral power distribution. The DisplayPort transmitter applies scrambling to the unencoded 8-bit byte, to yield another (scrambled) 8-bit byte, and then encodes the resulting 8-bit byte as a 10-bit symbol. The DisplayPort receiver performs the inverse process, firstly decoding the 10-bit symbol into the scrambled version of the 8-bit byte, and then descrambling the 8-bit byte in order to recover the original data.

The exemplary DisplayPort scramblers are based on an additive scrambler constructed from a Linear Feedback Shift Register (LFSR), although it will be appreciated that other types of scramblers may be used consistent with the invention. The exemplary prior art sixteen (16) bit LFSR has a characteristic polynomial according to Equation (1) below:

$$G(X)=X^{16}+X^5+X^4+X^3+1 \qquad (\text{Eqn. 1})$$

Where:
$G(X)$=The output symbol
$X^N$=The $N^{th}$ digit of the LFSR
+=XOR operation The output of the LFSR is XOR'd with the transmitted or received byte. The scrambling LFSR is symmetric for both the source and sink devices; i.e., the scrambling operation is identical to the descrambling operation (this is an inherent property of additive scramblers). Table 2 below illustrates the logic of an XOR operation:

TABLE 2

XOR Logic Table

| Input A | Input B | Output |
|---------|---------|--------|
| 0 | 0 | 0 |
| 0 | 1 | 1 |
| 1 | 0 | 1 |
| 1 | 1 | 0 |

DisplayPort Source devices replace every five hundred and twelfth (512th) BS symbol with a SR symbol. The SR symbol is used to reset the sink device's LFSR to 0xFFFFh. The LFSR is active for all symbols (i.e., both data symbols (D), and special symbols (K)), however only the data symbols are scrambled, the special symbols (K) are transmitted in their unscrambled form.

DisplayPort Synchronization—

Figure 3:
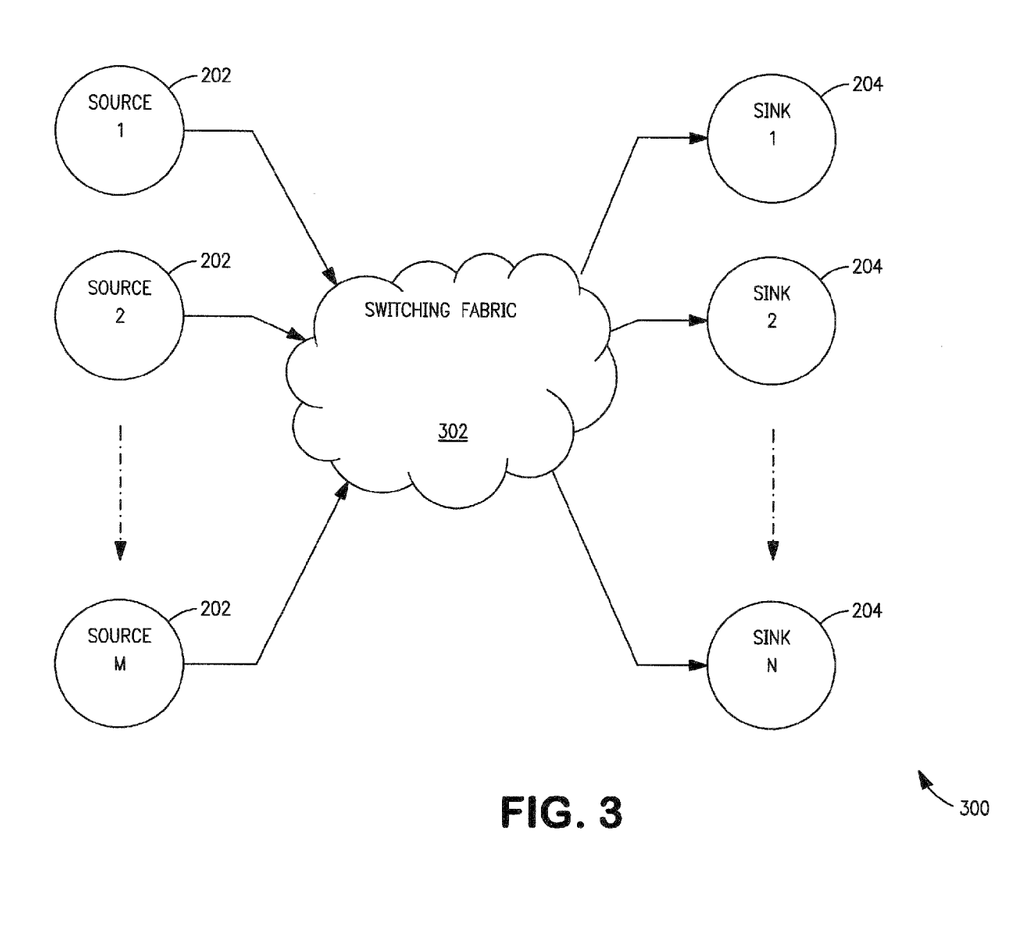
FIG. 3 illustrates one generalized network of devices connected by a switching fabric, illustrating various network embodiments of the present invention.

As previously alluded to, current DisplayPort standards support flexible A/V management. FIG. 3 illustrates one exemplary system 300 consisting of M source devices 202, and N sink devices 204 connected by a switching fabric 302. As used herein, the term "switching fabric" refers generally to a device, or network of devices capable of dynamically connecting and disconnecting sources to sinks. Common implementations include hubs, and/or networks of DisplayPort devices which can dynamically switch connections between sources and sinks during operation. Due to unknown delays between sources and sinks (e.g., varying topologies, device types, etc.) connections between sources and sinks have to be fully synchronized before the A/V data stream is used. For example, during a video stream transmission, an eDP display device must synchronize with the video frame, to ensure proper blanking operation.

Furthermore, while DisplayPort systems are generally homogenous networks of like devices, it is appreciated that homogeneity is not a requirement for operation. In fact, artisans having ordinary skill in the related arts will appreciate that heterogeneous networks may benefit in greater part, from solutions which provide faster synchronization over connections having unknown delays and characteristics. Thus, it is recognized that the switching fabric 302 of FIG. 3 may readily represent topologies which bridge between multiple network types having multiple heterogeneous or homogeneous entities.

Prior Art Synchronization Sequence—

Figure 4:
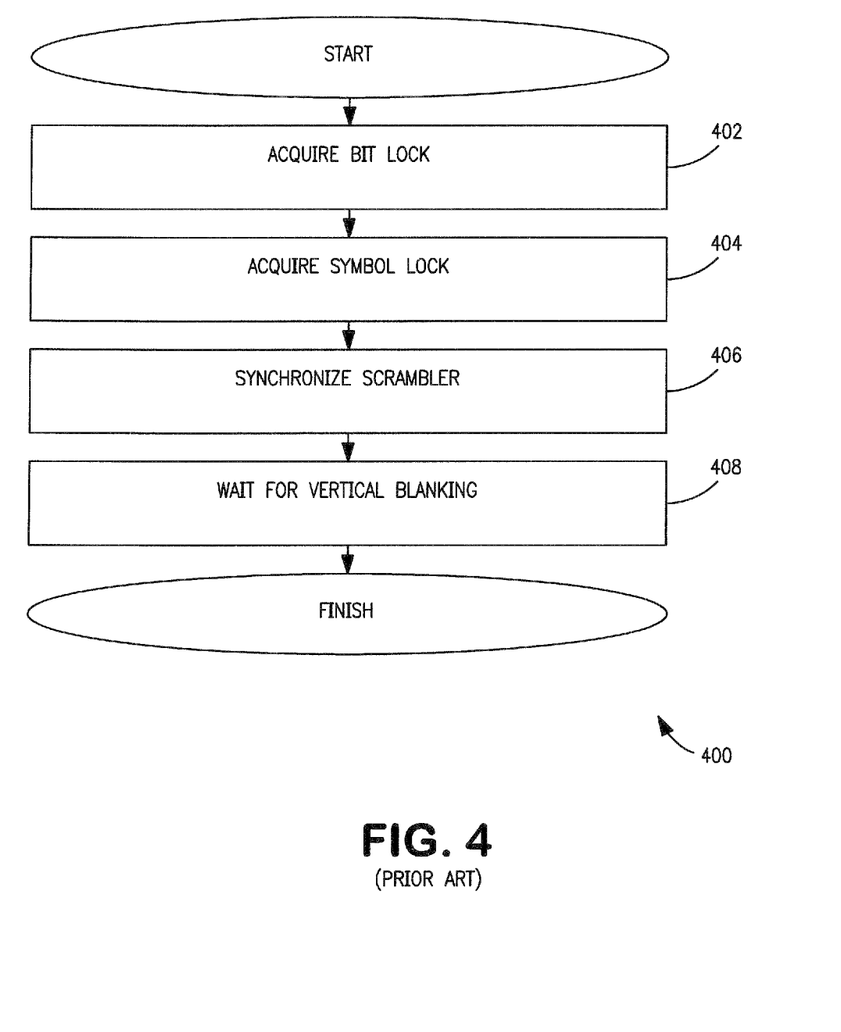
FIG. 4 is a functional block diagram representing one prior art procedure for full synchronization of a DisplayPort device.

FIG. 4 illustrates one prior art procedure for full synchronization 400. As noted supra, DisplayPort bitstreams are scrambled, coded with an 8B/10B line code, and transmitted without an accompanying clock, thereby greatly complicating symbol recognition.

At step 402, the device acquires bit lock. The receiver synchronizes its clocks to match the frequency and phase of the incoming bit stream. Common implementations for clock synchronization utilize negative feedback loops, and may include one or more of: Phase Locked Loops (PLLs), Delay Locked Loops (DLLs), Frequency Locked Loops (FLLs), etc. Common duration for bit lock using a receive (RX) PLL generally ranges between ten (10) and one hundred (100) microseconds.

Once bit lock has been achieved, the receiver acquires symbol lock (404). The receiver searches the incoming bit stream for a "comma sequence" such as K28.5 (other commonly used comma sequences are K28.1, K28.7). Within the context of the aforementioned DisplayPort standards, K28.5, K28.1, and K28.7 are the three (3) symbols that contain the singular 7-bit comma sequence, which is used to identify symbol boundaries. These symbols are specific to the 8B10B encoding scheme used in the current revision of DisplayPort. Other encoding schemes also have their own mechanisms for recognizing symbol boundaries.

Comma sequences identify the symbol boundaries. Receivers can confirm symbol lock after receiving several consecutive comma sequences; successful detection of four (4) such codes assures a high degree of robustness (i.e., likelihood of proper symbol lock). Comma sequences are transmitted once per scan line. The time to achieve symbol lock depends on implementation, and may vary significantly. Some implementations are able to align on the first comma symbol, whereas other implementations may shift their alignment one bit at a time, and may require between one (1) and nine (9) comma symbols, depending on degree of misalignment. A typical implementation of a display resolution of 1280×800 pixels, will acquire symbol lock in approximately eighty (80) microseconds.

At step 406, after the receiver achieves symbol lock, the receiver must synchronize its scrambler to properly decode the scrambled data stream. The receiver detects a Scrambler Reset (SR) K-code (K28.0). Some DisplayPort devices support enhanced framing modes that use a sequence of K-codes, such as SR (Scrambler Reset), CPBS (Copy Protection BS), CPBS, SR (i.e., K28.0, K28.1, K28.1, K28.0) instead of a single SR K-code. Once the appropriate trigger condition is detected, the receiver resets its internal scrambler. For example, prior art DisplayPort devices initialize an internal scrambling Linear Feedback Shift Register (LFSR) with an appropriate seed (e.g., 0xFFFFh when in normal mode, 0xFFFEh when in alternate scrambling mode). The SR K-code (or scrambling reset sequence) is transmitted once every five-hundred twelve (512) scan lines. Thus, for a 1280× 800 resolution display, step 406 can range from twenty (20) microseconds to roughly ten (10.3) milliseconds.

At step 408, once the receiver has reset its scrambler, the receiver waits for a vertical blanking interval, indicating the start of a new video frame. Prior art receivers generally search for a Blanking Start (BS) K-code, followed by the sequence: Vertical Blanking ID (VB-ID) with a VerticalBlanking_Flag set to zero (0), and the next BS followed by a VB-ID with a VerticalBlanking_Flag set to one (1). For a 1280×800 resolution display, the vertical blanking signaling can occur anywhere within forty (40) microseconds to roughly seventeen (16.66) milliseconds.

The prior art full synchronization sequence can last anywhere from approximately fourteen (13.5) milliseconds to greater than twenty seven (27) milliseconds. During this time, the timing controller (TCON) does not have valid video data, and will continue to display the most recent frame video data (from the previous source). For example, the sink device does not update its row/column drivers of its display, causing the display to brighten (a visual artifact known as bleaching). The intensity of the bleaching is logarithmically proportional to the delay; delays greater than sixteen (16) milliseconds are visually unacceptable. Clearly, improved methods are required to improve synchronization times so as to avoid, inter alia, such bleaching or other visual artifact.

Exemplary Scrambler Self-Synchronization—

One major contributing factor to the synchronization budget of the prior art sequence is the initialization of the scrambler (step 406 of FIG. 4). During this step, the receiver must wait for a SR K-code (or scrambler reset sequence) to synchronize its scrambler LFSR. Unfortunately, the relative infrequency of SR K-codes greatly contributes to increased synchronization times.

In contrast to prior art solutions, one exemplary embodiment of the present invention is configured to self-synchronize based on the received data symbols, rather than a specific control symbol or sequence. Additional logic is added to the receiver to synchronize a timing controller (TCON) when scrambled data symbols with known values are detected. This approach advantageously reduces synchronization times.

Figure 5:
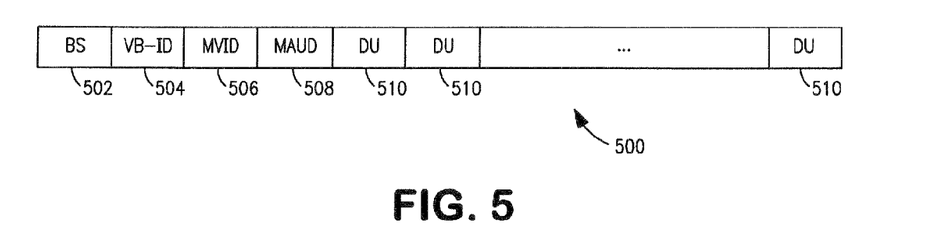
FIG. 5 represents one exemplary format for a vertical blanking scan line, on a byte-by-byte basis, useful in one embodiment of the present invention.
Figure 6:
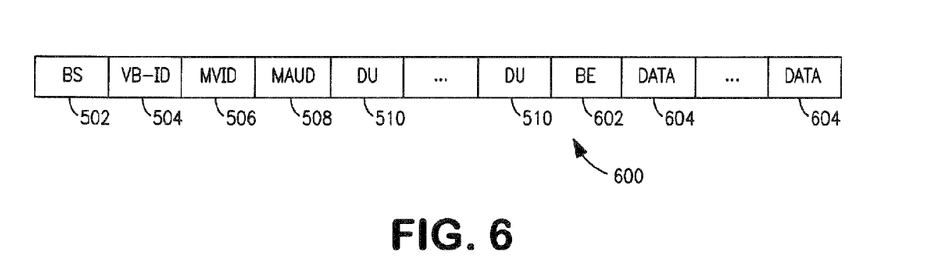
FIG. 6 represents one exemplary format for a video data scan line, on a byte-by-byte basis, useful in one embodiment of the present invention.
Figure 7:
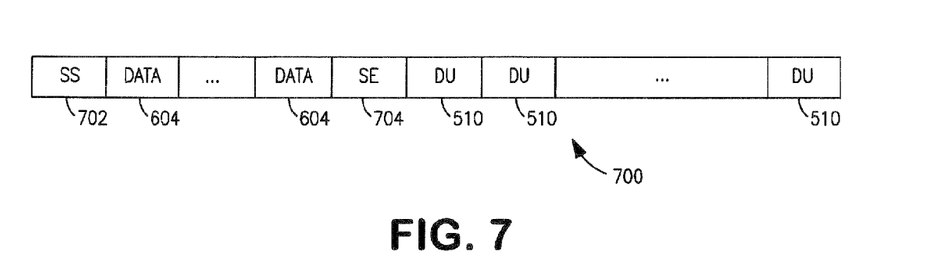
FIG. 7 represents one exemplary format for secondary data, on a byte-by-byte basis, useful in one embodiment of the present invention.

Recall that DisplayPort video streams (FIG. 1) are divided into (i) vertical blanking lines and (ii) video data lines. FIG. 5, FIG. 6, and FIG. 7 graphically represent the content of scan lines, on a byte-by-byte basis. As shown in FIG. 5, one exemplary vertical blanking line 500 comprising a Blanking Start byte (BS) 502, a Vertical Blanking ID byte (VB-ID) 504, a video counter (MVID) 506, an audio counter (MAUD) 508, and dummy bytes (DU) 510. The video and audio counters compensate for clock discrepancies between the data stream and the link rate. The dummy bytes of DisplayPort devices are set to zero (i.e., 0x00h). Any number of dummy bytes may be replaced by secondary data packets (described in FIG. 7).

FIG. 6 illustrates one exemplary video data line 600 comprising a Blanking Start byte (BS) 502, a Vertical Blanking ID byte (VB-ID) 504, a video counter (MVID) 506, an audio counter (MAUD) 508, dummy bytes (DU) 510, a Blanking End (BE) byte 602, and payload bytes (DATA) 604. The horizontal blanking interval is the period between the BS and BE. The payload may include scrambled data payloads (such as pixel data, stuffing data, etc.), as well as unscrambled control bytes (such as Fill Start (FS), etc.)

FIG. 7 represents one exemplary secondary data packet 700, which may be flexibly substituted for dummy bytes. Secondary data packets generally comprise one or more Secondary-data Start bytes (SS) 702, payload bytes (DATA) 604, and a Secondary-data End byte (SE) 704. Even though secondary data packets can be substituted for dummy bytes, secondary data packets represent a relatively insignificant fraction of the blanking interval; the vast majority of the blanking intervals are filled with dummy bytes.

Figure 8:
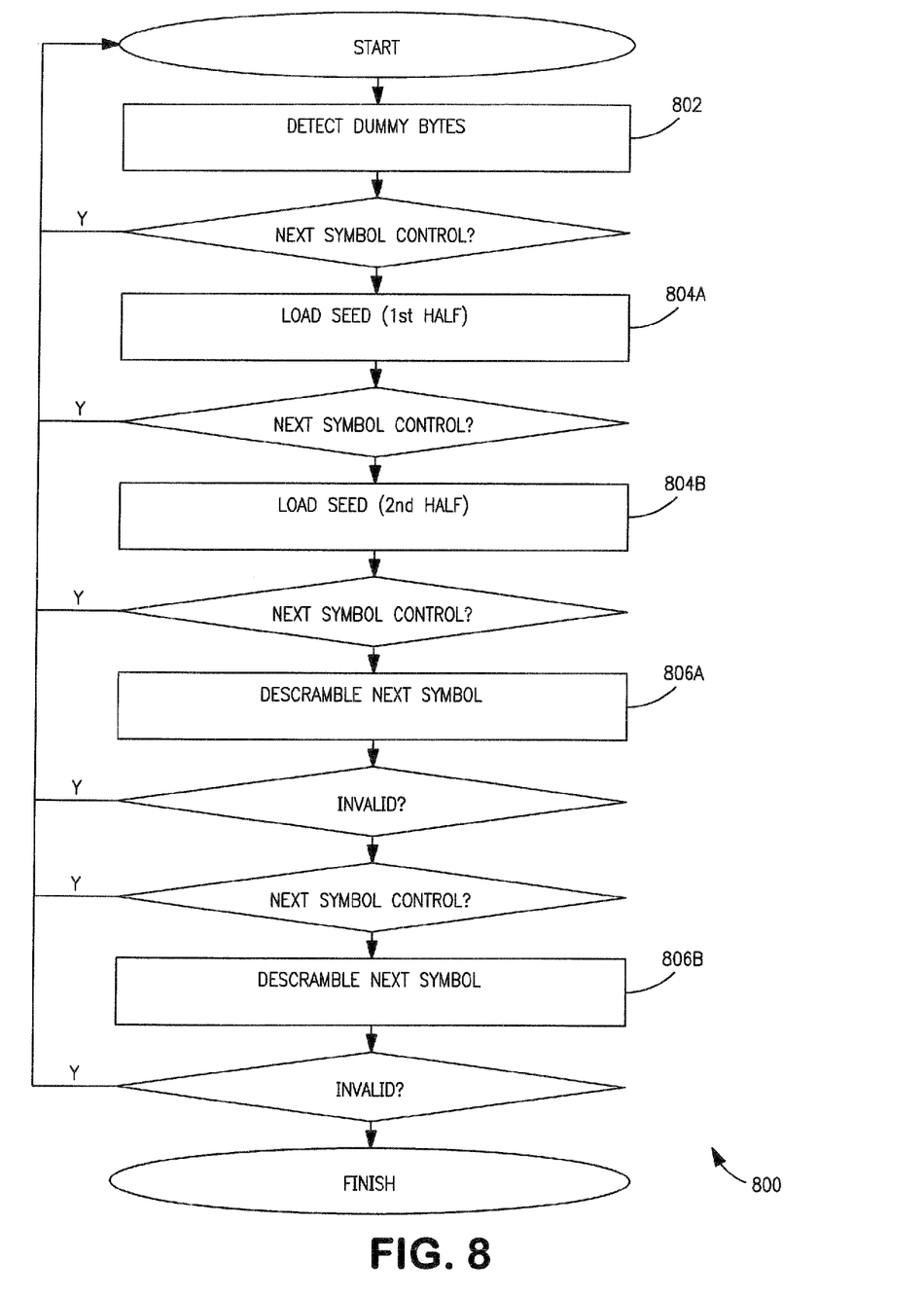
FIG. 8 is a functional block diagram of one exemplary method for synchronization based on dummy byte detection within blanking intervals, in accordance with various aspects of the present invention.

Referring now to FIG. 8, one exemplary method 800 is presented for synchronization based on dummy byte detection within blanking intervals, where the dummy bytes have known values (all zeros). Blanking intervals are sent at much higher frequency (once per scan line) than scrambler reset sequences (once per five-hundred twelve (512) scan lines); consequently, the receiver of the present invention can synchronize in much less time than when using prior art synchronization sequences.

At step 802, the exemplary device searches for two (2) bytes which are expected to be scrambled dummy bytes. Within the exemplary context of DisplayPort scan lines, one or more dummy bytes are expected to follow the BS, VB-ED, MVID, and MAUD bytes (see FIG. 5), or immediately after detecting an SE. If a control symbol is detected in the first byte, then the process resets for the next opportunity (i.e., the next BS or SE detection).

At step 804A, the scrambler is loaded with a modified half-seed. Specifically, the upper LFSR bits are loaded with the XOR of the received scrambled data byte (the expected dummy byte), with the expected value. Referring back to Table 2, the XOR of a zero with a zero is a zero (i.e., 0x0b+0x0b=0x0b), and the XOR of a one with a zero is a one (i.e., 0x1b+0x0b=0x1b). Thus, for systems where the expected value is all zeros, the upper LFSR may be loaded with the received scrambled data byte directly, greatly simplifying the circuitry implementation. However, an XOR of a zero with a one is a one (i.e., 0x0b+0x1b=0x1b), and the XOR of a one with a one is a zero (i.e., 0x1b+0x1b=0x10b; the Most Significant Bit (MSB) is dropped, thus, leaving 0x0b). Consequently, systems which have expected values that are not all zeros must include circuitry to properly calculate the seed. The seed is byte-swapped before loading, to reverse the effects of the LFSR order (i.e., the received symbols should be shifted out LSB first). In summary, for an expected dummy byte of all zeros, the LFSR bits [15:8] should be set to the received symbol [0:7].

If the next symbol is a control symbol, then the process resets for the next opportunity (i.e., the next BS or SE detection); otherwise, at step 804B, the second half of the seed is loaded. The LFSR bits [15:8] should be set to the second received symbol [0:7]. Note that the first half of the seed loaded in step 804A should have shifted eight (8) bits; i.e., the LFSR bits [7:0] should match the first symbol [0:7], the newly loaded LFSR bits [15:8] should match the second symbol [0:7].

If the next symbol is a control symbol, then the process resets for the next opportunity (i.e., the next BS or SE detection); otherwise, at step 806A, the next symbol is descrambled as usual, using the seed defined in steps 804A, 804B. If the scrambler has been properly set and the first half of the seed is valid, then the scrambling operation should return the expected result (all zeros). If the first half of the seed has been corrupted or is otherwise invalid, then the scrambling operation will return a value different than the expected result; the process is reset for the next opportunity (i.e., the next BS or SE detection).

If the next symbol is a control symbol, then the process resets for the next opportunity (i.e., the next BS or SE detection); otherwise, at step 806B, the next symbol is descrambled as usual. If the scrambler second half of the seed is also valid, then the scrambling operation should return the expected result (all zeros). If both steps 806A and 806B succeed, then the device is synchronized, and the entire seed is valid.

As previously discussed, the foregoing examples are based primarily on the exemplary DisplayPort-specific protocols, implementations, etc. for purposes of clarity and illustration. Consequently, a description of generalized methods and apparatus for implementing one or more aspects of the present invention outside of the DisplayPort context is now presented.

Methods—

The following discussion provides generalized methods for self-synchronization of audio/visual (AV) entities. In one implementation of the invention, the method involves: (i) identifying an encoded symbol having an expected value, (ii) predicting a code seed from the encoded symbol and the expected value, and (iii) verifying the seed. While the previous descriptions have focused on LFSR based scramblers as used in the DisplayPort standard, alternative embodiments and variations will be readily appreciated by those of ordinary skill given the present disclosure.

Furthermore, while the following methods are described primarily in the context of a connection between a first device and a second device, the following procedure is equally applicable to topologies having M first devices connected to N second devices. Moreover, it is appreciated that virtually any topology may benefit from various aspects of the present invention, including inter alia, distributed mixing systems, tree distribution systems, daisy chained operation, etc. Artisans having ordinary skill in the related arts will readily recognize that the foregoing solution may also be configured for use within networks or multiple networks having indeterminate delays, such as, for example, heterogeneous networks spanning multiple different technologies and/or protocols.

Figure 9:
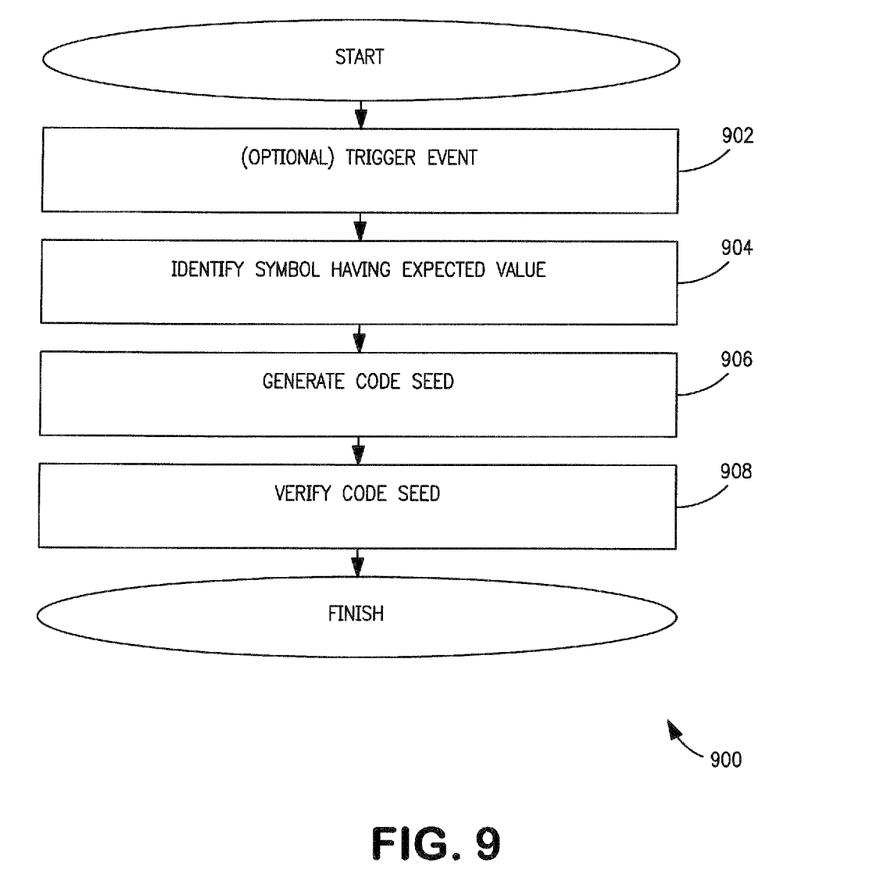
FIG. 9 is a functional block diagram of one generalized method for synchronization based on encoded symbol detection in accordance with various aspects of the present invention.

FIG. 9 illustrates one exemplary generalized method 900 for self-synchronization according to the invention. At step 902 of FIG. 9, a triggering event is optionally detected. In one exemplary embodiment, the triggering event is the detection of one or more unencoded symbols. In one such variant, the unencoded symbol is correlated with a data boundary (e.g., a frame, time slot, etc.). Common examples of such data boundary correlated symbols include without limitation preambles, post-ambles, mid-ambles, etc. In yet other variants, the unencoded symbol corresponds to a time event. Common examples of time events include without limitation periodic "tick" symbols, timestamp symbols, counter symbols, expiration of a timer, etc.

In alternate embodiments, synchronization is triggered based on something other than detection of one or more unencoded symbols; e.g., on presence detection. In one variant, presence detection includes the detection of one or more encoded symbols; certain protocols may even enable detection of encoded symbols without requiring symbol decoding. In yet other variants, presence detection can be triggered with "hot-plug" detection. In still further variants, presence detection is performed via an out-of-band service (such as a registry service, etc.), by another party, by a user interface, etc.

In yet other alternate embodiments, the triggering event is a request or detection of request for synchronization. The request may be received in an unencoded message, via an alternate interface, based on a connection detection, etc.

At step 904, one or more coded symbol(s) having an expected value are identified. In one exemplary embodiment, the coded symbol(s) is/are extracted at a fixed position after one or more unencoded control symbols. For example, as previously described (see "Exemplary Scrambler Self-Synchronization" discussed supra), one or more dummy byte(s) occur three (3) bytes after a Blanking Start (BS), and also immediately after a Secondary-data End (SE). Alternatively, the position may not be fixed, but rather determined upon examination of the relationship of two or more other symbols, or according to a specific received value. Moreover, other implementations may have still other properties, the foregoing example based on the specific properties of the DisplayPort scrambler. With a different technology, a different shift value may be required. In fact, any easily recognized structure embedded within the incoming stream can be used, provided that it enables prediction of the data (or a defined subset thereof) at a subsequent point in the incoming stream. For example, other examples may include a byte of all ones, a byte of an arbitrary (but predefined) value (e.g., half ones half zeroes, etc.), and even bytes that are partially known (e.g., half of the byte is padded, etc.)

In one implementation, the expected value is all zeros. In yet other implementations, the expected value is non-zero, but has particular predictable qualities. Common examples of such qualities can include: known identification (e.g., a device ID), time related values (e.g., a timestamp), location related values (e.g., a region specific identifier), user related values (e.g., a user ID), etc.

In yet other embodiments, the expected value is selected based on one or more mathematical properties which can correspond to a reduction in circuitry (thereby simplifying the apparatus). For example, while a scrambler using XORs can be coupled with an "all zeros" symbol (i.e., an XOR with zero is a mathematical "identity" function), a scrambler using an XNOR can be coupled with an "all ones" symbol (i.e., an XNOR with one is a mathematical identity function).

At step 906, an initiation value is generated. In one exemplary embodiment, the initiation value is a code seed (e.g., a seed for a scrambler). In one such embodiment, the scrambler is an additive scrambler; i.e., the scrambler output is added to the transmitted symbol. In other such embodiments, the scrambler is a pass-through scrambler; i.e., output of the scrambler is the transmitted symbol.

In one exemplary embodiment, the code seed is derived from one or more received symbols and one or more expected values. In the previously shown example, two (2) bytes are used to determine the current LFSR state. More generally, any first number of symbols could be used to generate any second number of seeds. For example, an LFSR having a thirty two (32) bit seed might require four (4) bytes to generate a seed. Similarly, a system having a pair of sixteen (16) bit LFSRs could be initialized from a single thirty-two (32) bit word.

As previously alluded to, ones having ordinary skill in the relevant art will recognize that an LFSR-based scrambler can also be represented as a state machine. The previously discussed DisplayPort Scrambler has a new state for every symbol (i.e., $2^{16}-1$ states or 65535 states). The described process for self-synchronizing an LFSR based scrambler is an arithmetic operation adapted to identify the current state of the transmitting LFSR state machine from identified dummy bytes. More generally, one aspect of the present invention relates to determining the current state of an encoding communication state machine, based on identifying one or more encoded symbols having an expected value. In one exemplary embodiment, the present invention exploits an arithmetic property of the state machine, given an expected value. In one implementation of this concept, a mathematical identity (such as XOR, XNOR, etc.) of the transmission state machine is exploited. In this case, as the LFSR state machine advances, it preserves the partial information that has been recovered while the remainder of the information is being recovered. However, it is appreciated that other incarnations may require a different number of operations. For example, if the LFSR can recover sixteen (16) bits at a time, then the entire scrambler state can be recovered in a single operation.

Similarly, one having ordinary skill in the relevant arts will recognize that an LFSR-based scrambler can also be represented as a deterministic function of the LFSR bits and the symbol. Thus, the described process for self-synchronizing an LFSR based scrambler might also be described as an arithmetic operation adapted to identify the LFSR bits based on a known expected symbol (e.g., all zeros). Accordingly, another aspect of the present invention relates to determining the one or more unknown or "hidden" operands for an arithmetic operation, based on identifying one or more encoded symbols having an expected value.

Referring again to FIG. 9, one or more code seeds are verified at step 908. In one exemplary embodiment, one or more code seeds are used to decode the one or more arriving symbols. Successful decoding of one or more arriving symbols verifies the derived code seeds. In yet other systems, a number of properly decoded symbols may be verified via an operation (such as a Cyclic Redundancy Check (CRC), parity check, etc.).

Apparatus—

Figure 10:
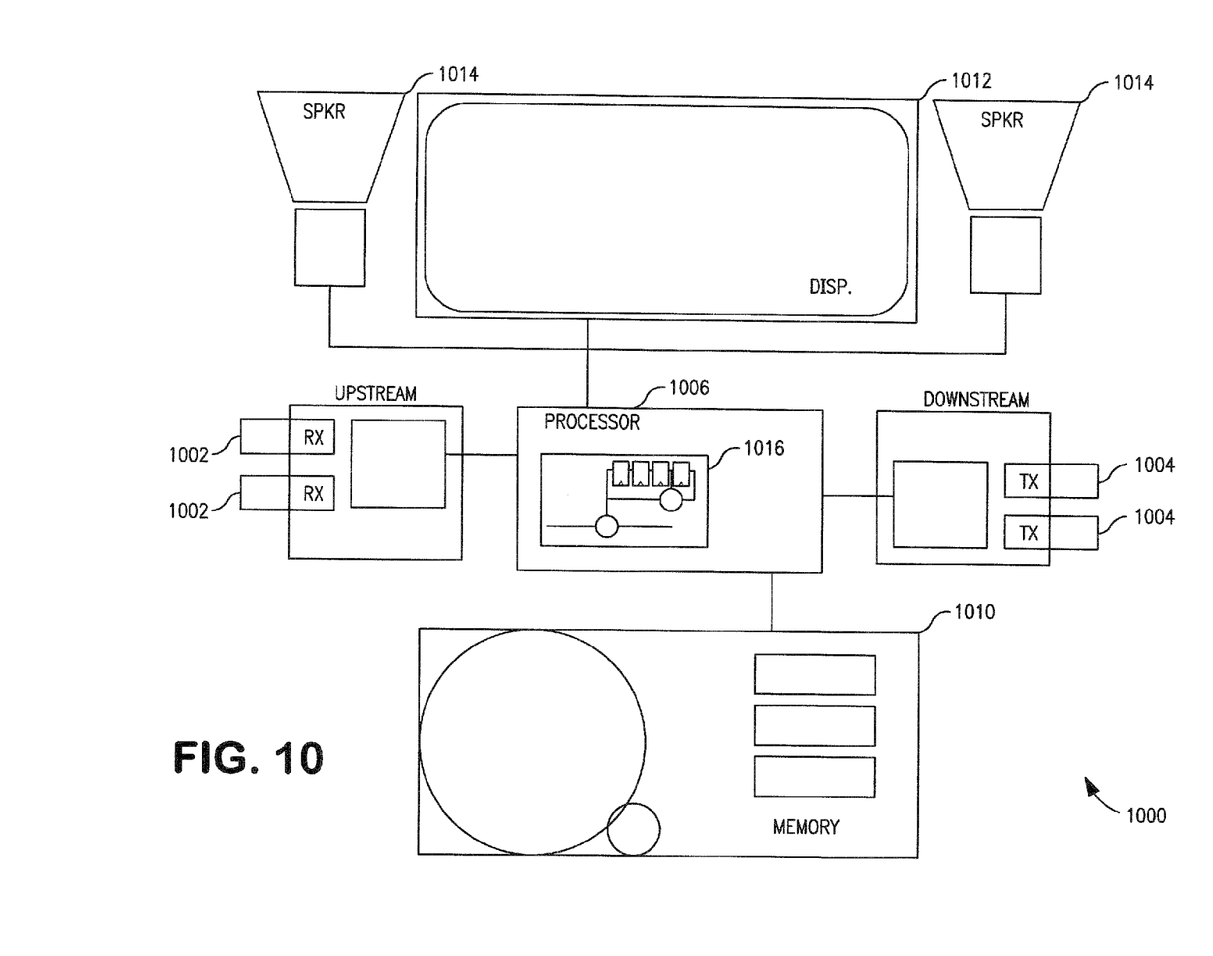
FIG. 10 is a functional block diagram illustrating one embodiment of a device adapted to implement the self-synchronization methods of the present invention.

Referring now to FIG. 10, an exemplary user device apparatus 1000 having self synchronizing scrambler capabilities is illustrated. As used herein, the term "user device" includes, but is not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, display devices (e.g., those compliant with the aforementioned DisplayPort standard(s)), or any combinations of the foregoing. While a specific device configuration and layout is shown and discussed, it is recognized that many other implementations may be readily implemented by one of ordinary skill given the present disclosure, the apparatus 1000 of FIG. 10 being merely illustrative of the broader principles of the invention.

The illustrated apparatus 1000 of FIG. 10 includes an upstream plurality of ports and corresponding receiving elements (e.g., receiver or transceiver network interfaces) 1002, a downstream plurality of ports and corresponding transmitting elements (transmitting interfaces or transceivers) 1004. As used herein, the terms "network interface" or "interface" typically refer to any signal, data, or software interface with a component, network or process including, without limitation, those of the FireWire (e.g., FW400, FW800, etc.), USB (e.g., USB2, USB 2.0, USB 3.0, wireless USB), DisplayPort, Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or DOB, cable modem, etc.), Wi-Fi (e.g., 802.11a, b, g, n, or any draft standards relating thereto), WiMAX (802.16), PAN (802.15), IrDA or other wireless families.

The upstream plurality of ports and associated receiving elements 1002 may include one or more upstream auxiliary channels, one or more upstream media ports, and receiver apparatus (e.g., multiplexing switches, reception logic, clock recovery circuitry, etc.). In one exemplary embodiment, the auxiliary channel is bi-directional and carries management and device control data, and the upstream media ports minimally comprise receivers for unidirectional data lanes, and use of an embedded clock. The receiver apparatus monitors and selectively enables and disables the auxiliary and media ports. In certain embodiments, the receiver apparatus is adapted to utilize a packet-based unidirectional network protocol, such as the DisplayPort protocol previously described herein.

Similarly, the downstream plurality of ports and associated receiving elements 1004 comprise one or more downstream auxiliary channel, one or more downstream media ports, and transmitter apparatus (e.g., demultiplexing switches, transmission logic, clock embedding circuitry, etc.). In one exemplary embodiment, the auxiliary channel is bi-directional and carries management and device control data, and the downstream media ports minimally comprise transmitters for unidirectional data lanes, and inclusion of an embedded clock. The transmitter apparatus monitors and selectively enables and disables the auxiliary and media ports. As with the receiver, the transmitter apparatus may be adapted to utilize a packet-based unidirectional network protocol (e.g., DisplayPort).

It will be appreciated that not all elements are required in a single device for operation within a network. For instance, a device only capable of "source" operation would not require upstream ports, or certain audio or video elements. Conversely, a "sink" device may not require downstream ports. Moreover, the "receiver" 1002 and "transmitter" 1004 elements may comprise transceivers capable of both transmission and reception if desired (i.e., bidirectional operation).

The processing subsystem 1006 includes one or more of central processing units (CPU) or digital processors, such as a microprocessor, digital signal processor, field-programmable gate array, RISC core, or plurality of processing components mounted on one or more substrates. The processing subsystem is coupled to operational memory 1010, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 1006 includes discrete components; however, it is understood that in some embodiments they may be consolidated or fashioned in a SoC (system-on-chip) configuration.

The processing subsystem 1006 is adapted to receive one or more media streams from an upstream apparatus for processing for media displays such as a video display 1012, or audio speakers 1014. Processing subsystem 1006 may preferentially comprise graphics processors, applications processors, and or audio processors. In "thin clients", the processing subsystem 1006 may be significantly reduced in complexity and limited to simple logic, or in extreme cases altogether non-existent. Accordingly, the processing subsystem 1006 may be connected to a memory subsystem 1010 comprising memory which may for example be hard disk drives, or solid state memory (e.g. RAM, FLASH) type components. The memory subsystem may implement one or a more of DMA type hardware, so as to facilitate data accesses as is well known in the art.

The self-synchronizing circuitry 1016 is, in an exemplary embodiment, tightly coupled for execution on the processing subsystem. This circuitry could be embodied in hardware, software or a combination of both. As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices, digital processors, SoC devices, FPGAs, ASICs, ADCs, DACs, transceivers, memory controllers, and other devices, as well as any combinations thereof. It is however recognized that the self-synchronizing scrambling circuitry could alternatively be decoupled and executed independent of the processing element in alternate embodiments.

The self-synchronizing circuitry comprises a Linear Feedback Shift Register (LFSR) adapted to receive a scrambled stream. In one exemplary embodiment, the LFSR is adapted to load an initial seed, the seed derived from the input bitstream. The seed generation is based on e.g., the detection of one or more unscrambled symbols. In one variant, the seed is generated from a byte swapped version of the scrambled input bitstream. In this variant, the seed generation is enabled with reference to the detection of the unscrambled symbol.

In an exemplary embodiment, the scrambling circuitry 1016 of the apparatus of FIG. 10 is implemented at least in part as a computer program; e.g., module of executable application software embodied within a tangible medium such as a physical block of memory (for example, the memory subsystem 1010 of FIG. 10). As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Once the LFSR is synchronized, the data can be used, for example to drive the display 1012 and/or speakers 1014. In some embodiments, the source device may additionally select which of the inputs is being displayed (e.g., via a switch). The display 1012 can show the image from the "new" stream quickly, without the image from the "old" input stream "bleaching".

In some use cases, the recovered image stream may be relayed to a third device (e.g., a box-to-box connection); in such scenarios, the processor 1006 will re-scramble the output (e.g., via a second LFSR). The state of the second LFSR is independent of the state of the first LFSR, and the two LFSRs do not need to be synchronized. The receiver of the third device would need to synchronize its LFSR to this second LFSR.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of synchronizing a source and sink for transmission of a data stream over an interface so as to avoid the occurrence of significant user-detectable artifact, the method comprising:
   receiving, from the source, at least a portion of the data stream at the sink, wherein the data stream comprises one or more encoded data symbols transmitted within a blanking line of a video frame and one or more synchronization symbols;
   detecting a triggering event;
   based at least in part on the triggering event, utilizing the one or more encoded data symbols within the at least received portion of the data stream to perform self-synchronization of the sink, the one or more encoded data symbols occurring at a frequency greater than that of the one or more synchronization symbols.

2. The method of claim 1, wherein the one or more synchronization symbols comprise one or more scrambler reset control symbols.

3. The method of claim 1, wherein the one or more encoded data symbols occur at a particular position relative to one or more unencoded symbols within the blanking line of the video frame.

4. The method of claim 1, wherein the user-detectable artifact comprises visual image bleaching.

5. The method of claim 1, wherein detecting a triggering event comprises detecting a triggering event within the at least portion of data stream.

6. The method of claim 5, wherein the detecting a triggering event within the at least portion of data stream comprises detecting one or more unencoded symbols.

7. The method of claim 1, wherein detecting a triggering event comprises detecting a triggering event associated with the interface.

8. A method of synchronizing a source and sink for transmission of a data stream over a signal interface so as to avoid the occurrence of significant user-detectable video artifact, the method comprising:
   receiving at least a portion of the data stream at the sink; and
   utilizing one or more symbols within the at least received portion of the data stream to perform self-synchronization of the sink, the one or more symbols occurring at an interval within the data stream that is less than a maximum allowable synchronization interval associated with the significant user-detectable video artifact, wherein utilizing the one or more symbols includes:
   identifying a scrambled symbol in the data stream, the scrambled symbol having an expected value and being provided by a scrambler,
   determining a predicted state value based at least in part on (i) one or more received symbols, and (ii) one or more expected values, and
   verifying the predicted state value to determine whether the scrambler is synchronized.

9. The method of claim 8, wherein verifying further comprises decoding of one or more arriving encoded symbols using a current state value.

10. The method of claim 9, wherein verifying further comprises performing at least one of a Cyclic Redundancy Check or a parity check on one or more decoded symbols.

11. A digital computerized apparatus for synchronizing a data stream transmission between a source and a sink, comprising:

a network interface;

a processor in data communication with the network interface;

at least one upstream receiving port to receive an input bit stream, the at least one upstream receiving port comprising an auxiliary channel and a media port;

at least one downstream transmitting port; and a self-synchronizing circuitry configured to:
- derive a first sequence of bits when an unscrambled control symbol is received in the input bit stream,
- at least partially seed the self-synchronizing circuitry with the first sequence of bits, and
- determine a self-synchronization state of a scrambler based on one or more predetermined criteria.

12. The digital computerized apparatus of claim 11, wherein the one or more predetermined criteria comprise at least a determination of whether an encoded symbol has been successfully decoded.

13. The digital computerized apparatus of claim 11, wherein the self-synchronizing circuitry configured to derive the first sequence of bits is further configured to derive a seed value based at least in part on an encoded symbol bearing a known relationship with the unscrambled control symbol.

14. The digital computerized apparatus of claim 11, wherein the at least one upstream receiving port is configured to selectively enable and disable the auxiliary channel and the media port.

15. The digital computerized apparatus of claim 11, wherein the at least one upstream receiving port is configured to utilize a packet-based unidirectional network protocol.

16. The digital computerized apparatus of claim 11, wherein the self-synchronizing circuitry comprises a descrambler apparatus configured to descramble a symbol in the input bit stream.

17. The digital computerized apparatus of claim 16, wherein the descrambler apparatus comprises a linear feedback shift register.

* * * * *